Patented Oct. 24, 1922.

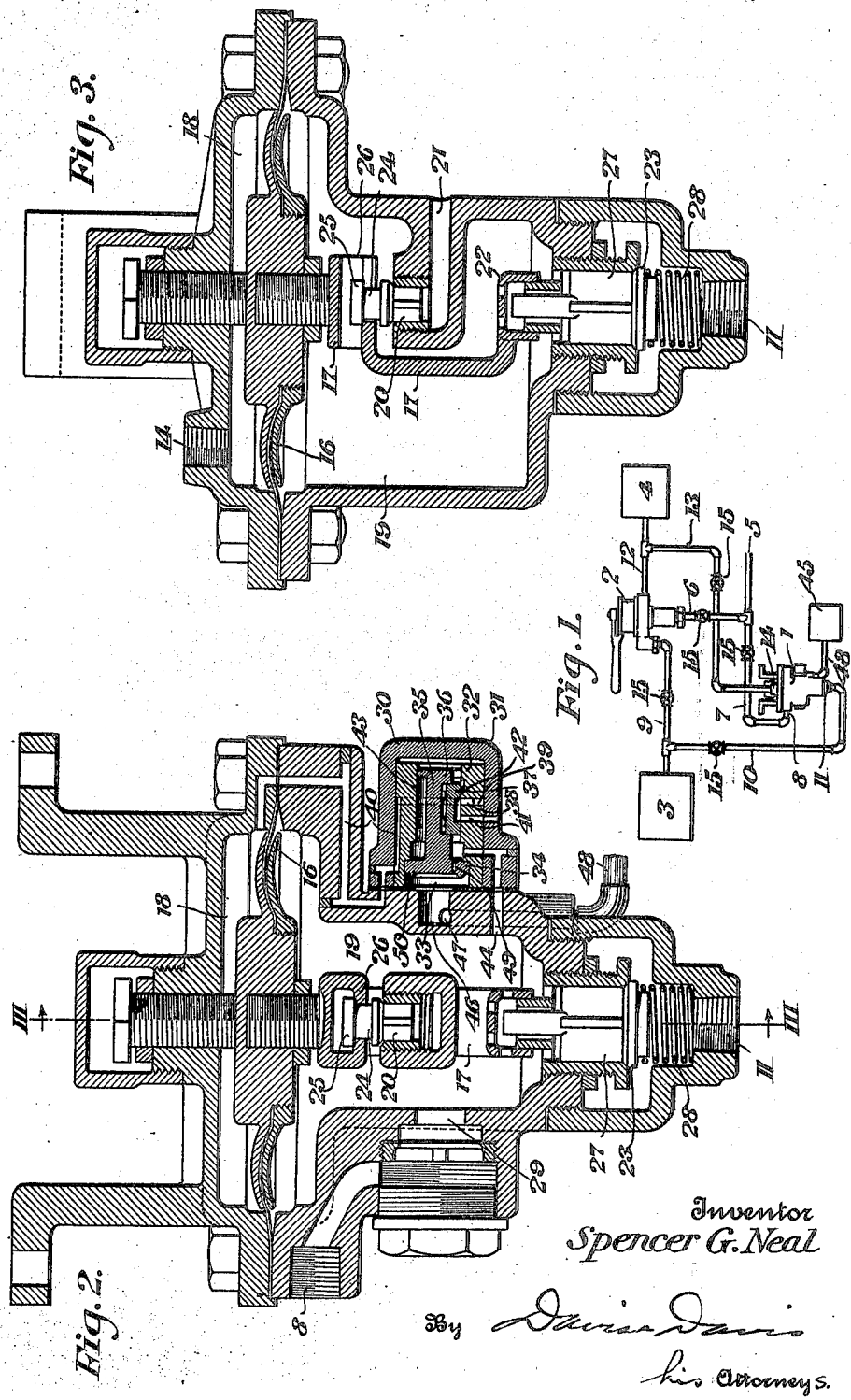

1,433,406

UNITED STATES PATENT OFFICE.

SPENCER G. NEAL, OF NEW YORK, N. Y., ASSIGNOR TO AUTOMATIC STRAIGHT AIR BRAKE COMPANY, OF WILMINGTON, DELAWARE, A CORPORATION OF DELAWARE.

COMPENSATING VALVE.

Application filed January 3, 1921. Serial No. 434,738.

*To all whom it may concern:*

Be it known that I, SPENCER G. NEAL, a citizen of the United States, and residing in the borough of Manhattan, city, county, and State of New York, have invented certain new and useful Improvements in Compensating Valves (Case No. 39), of which the following is a specification.

This invention relates to improvements in that type of compensating valves shown in Patent No. 1,089,579, dated March 10, 1914, and also shown in Patent No. 1,314,975, dated September 2, 1919. These compensating valves are operated by equalizing reservoir pressure and brake pipe pressure and control a connection between the main reservoir and the brake pipe and between the brake pipe and atmosphere, and maintain a uniform brake pipe pressure.

The object of this invention is to provide means to insure a rapid reduction in equalizing reservoir pressure when the engineer's brake valve is placed in emergency position for the purpose of securing an emergency application of the brakes. When the engineer's brake valve is placed in emergency position, there is a very rapid reduction in brake pipe pressure and a slower reduction in equalizing reservoir pressure, and it is the object of this invention to provide means for quickly reducing the equalizing reservoir pressure to zero, or approximately so, in order to insure the rapid operation of the compensator in emergency applications of the brakes and to prevent the main reservoir pressure exhausting through the compensator. Another object of the invention is to provide means whereby the equalizing reservoir venting means will not operate during all slow service reductions in brake pipe pressure, but will only operate on a sudden reduction in brake pipe pressure designed to secure an emergency application of the brakes.

In the drawing:

Fig. 1 is a diagrammatic view showing the compensator and its connections to the engineer's valve and the main reservoir and equalizing reservoir;

Fig. 2 is a vertical sectional view of the compensating valve; and

Fig. 3 a similar view taken on the line III—III of Fig. 2.

Referring to the various parts by numerals, 1 designates the compensating valve; 2 the engineer's brake valve; 3 the main reservoir; and 4 the equalizing reservoir. The brake pipe 5 is connected to the engineer's brake valve by pipe 6, in the usual manner, and is connected to the compensator by pipe 7, the latter pipe being connected to the compensator at 8. The main reservoir is connected to the engineer's valve by pipe 9 and to the compensator by pipe 10, said pipe being connected to the bottom of the compensator at 11. The equalizing reservoir is connected to the engineer's valve by pipe 12 and to the compensator by pipe 13, said pipe being connected to the compensator at 14. All of these pipes are provided with the usual cut-off valves 15. The engineer's valve may be modified, as described in Patent No. 1,089,579 and also in Patent No. 1,314,975, to render the equalizing discharge piston inoperative, so that the brake pipe exhaust will be secured through the compensating valve.

The main operating parts of the compensating valve are constructed substantially as shown in Patent No. 1,314,975, and comprise a casing in which is arranged a diaphragm 16 from which depends the valve-operating yoke 17. The diaphragm 16 divides the interior of the casing into an upper equalizing chamber 18 which is in communication with the equalizing reservoir 4 through pipe 13; and a lower brake pipe chamber 19 which is at all times in communication with the brake pipe 5 through the branch pipe 7. A release valve 20 is connected to the yoke 17 and is provided with a depending winged portion which travels in a valve cage formed at the inner end of an exhaust passage 21. The yoke 17 at its lower end is provided with a horizontally extending arm 22 which is in alignment with the stem of an upwardly seating supply valve 23. The arm 22 is formed with a depending annular guide flange which engages a rigid guide carried by the valve casing. It is obvious that when diaphragm 16 is depressed by a superior pressure in the equalizing reservoir chamber 18, the exhaust valve 20 will be closed and the supply valve 23 will be opened. It is also obvious that when the brake pipe pressure in chamber 19 is superior to the pressure in chamber 18, the exhaust valve 20 will be opened and the supply valve 23 will be closed, because of the lost-motion connection between the yoke 17 and valves 24 and 27. There is a point in the movement of the diaphragm 16 at which both of said valves may be closed. This also insures the closing of one valve before the other valve is opened by the movement of the diaphragm.

The release valve 20 is formed with an upwardly extending neck 24 terminating in a head 25. The yoke 17 is provided with a forked portion 26 which receives the neck 24 and connects the release valve to the yoke.

The supply valve 23 is guided by a winged portion 27 and is held yieldingly to its seat by a spring 28 which normally forces the valve upwardly. The space in the casing below the supply valve 23 is in communication with the main reservoir through pipe 10, so that whenever said valve is opened through the operation of the diaphragm 16, main reservoir air will flow into the chamber 19 and thence to the brake pipe through opening 29.

When the engineer's brake valve is placed in emergency position, brake pipe pressure is exhausted through the brake valve more rapidly than the equalizing reservoir pressure is reduced. The result of this is that the pressure in the equalizing reservoir chamber 18 of the compensating valve will, during a certain period, exceed the pressure in the brake pipe chamber 19 of the compensating valve and the diaphragm 16 will be depressed during that period of time and the supply valve 23 will be held open. During this period the main reservoir air will pass through the compensating valve to the brake pipe and then to atmosphere through the engineer's brake valve, until the pressure in the qualizing reservoir has been exhausted, at which time the supply valve 23 will be closed.

To immediately exhaust the equalizing reservoir pressure upon a sudden reduction of brake pipe pressure, I provide the equalizing reservoir vent valve 30. This vent valve consists of a casing 31 secured to the compensating valve casing and provided with an interior bushing 32. The bore of this bushing is enlarged at its inner end to form the piston chamber 33. In this piston chamber is mounted a piston 34 having an outwardly extending stem 35 which carries at its outer end a guide head 36 which is designed to reciprocate in the bore of the bushing 32 near the outer end thereof. Connected to the piston stem is a small slide valve 37, the interior of the bushing 32 forming the seat for said valve.

The seat of the slide valve 37 is formed with a port 38 which is connected by an annular passage 39 with a passage 40 which leads to the equalizing reservoir chamber 18. The said valve seat is also formed with an exhaust port 41 leading direct to atmosphere; and the slide valve is formed with a release groove 42 which when the valve is in release position connects the port 38 to the port 41, as shown in Fig. 2, and permits the equalizing reservoir chamber 18 to exhaust to atmosphere.

The bushing 32 forms a chamber 43 which is in communication with the brake pipe chamber 19 through a passage 44. A small chamber 46 on the opposite side of the piston 34 from chamber 43, is in communication with a small tank 45 by means of a passage 47, and pipe 48. A small leak port 49 is formed through the piston 34 so that brake pipe pressure in chamber 43 may slowly pass through said port into chamber 46, and then through passage 47 to the tank 45. It is obvious that a rising brake pipe pressure will force the piston 34 toward the left hand, or inwardly, and move the slide valve 37 to close the port 38. The piston is provided with an annular rib 50 which is adapted to engage a gasket when at the inner limit of its movement to thereby seal chamber 43 from the tank 45, except for the small leak port 49.

During all slow reductions in brake pipe pressure, air will flow from the tank 45 through leak port 49 into chamber 43 and thence into the brake pipe chamber 19, and there will be no movement of the piston 34 and slide valve 37. When, however, there is a sudden reduction of brake pipe pressure for the purpose of securing an emergency application of the brakes, the reduction of pressure in chamber 19 and also in chamber 43 will be too rapid to permit an equalization of pressures on opposite sides of the piston 34. The trapped pressure in tank 45, consequently, will move the piston 34 outwardly and the slide valve 37 will place port 38 in communication with exhaust port 41, so that equalizing reservoir pressure in chamber 18 will be exhausted to atmosphere. This will prevent a downward movement of the diaphragm 16 and the opening of the supply valve 23. The vent valve parts will remain in this position until there is an increase in brake pipe pressure whereupon the piston will be moved inwardly and the port 38 again closed by the slide valve 37.

What I claim is:

1. The combination of a compensating valve adapted to be operated by opposed brake pipe and equalizing reservoir pressures, and a vent valve adapted to be operated upon a sudden reduction in brake pipe pressure to vent the equalizing reservoir to atmosphere.

2. The combination of a compensating valve adapted to be operated by opposed brake pipe and equalizing reservoir pressures, a vent valve adapted to be operated upon a sudden reduction in brake pipe pressure to vent the equalizing reservoir to atmosphere, and means to permit said vent valve to remain inactive during all slow reductions of brake pipe pressure.

3. A compensating valve comprising a casing, a diaphragm therein and forming an equalizing reservoir chamber and a brake pipe chamber, a supply valve, a release valve, both of said valves being adapted to be operated by said diaphragm in response to variations of pressure in the equalizing reservoir chamber, the supply valve being opened when the equalizing reservoir chamber pressure exceeds the pressure in the brake pipe chamber and the release valve being opened when the equalizing reservoir pressure is below the brake pipe pressure, a vent valve for the equalizing reservoir chamber, and means whereby said valve will remain inactive during all slow changes of pressure in the brake pipe chamber but will respond to a sudden reduction of pressure in the brake pipe chamber to open said vent valve and exhaust the air from the equalizing chamber to atmosphere.

4. A compensating valve comprising a casing, a diaphragm therein and forming an equalizing reservoir chamber and a brake pipe chamber, a supply valve, a release valve, both of said valves being adapted to be operated by said diaphragm in response to variations of pressure in the equalizing reservoir chamber, the supply valve being opened when the equalizing reservoir chamber pressure exceeds the pressure in the brake pipe chamber and the release valve being opened when the equalizing reservoir pressure is below the brake pipe pressure, a vent valve for the equalizing reservoir chamber comprising a piston subject on one side to the pressure in the brake pipe chamber and on the other side to a trapped pressure, means for slowly equalizing the pressures on opposite sides of said piston whereby a sudden reduction of pressure in the brake pipe chamber will permit the trapped pressure to move said piston, and an exhaust valve adapted to be moved by said piston to open an exhaust port from the equalizing reservoir chamber upon a sudden reduction of pressure in the brake pipe chamber.

5. A compensating valve comprising a casing, a diaphragm therein and forming an equalizing reservoir chamber and a brake pipe chamber, a supply valve, a release valve, both of said valves being adapted to be operated by said diaphragm in response to variations of pressure in the equalizing reservoir chamber, the supply valve being opened when the equalizing reservoir chamber pressure exceeds the pressure in the brake pipe chamber and the release valve being opened when the equalizing reservoir pressure is below the brake pipe pressure, a vent valve for the equalizing reservoir chamber comprising a casing, a piston therein dividing said casing into two chambers, a leak port formed through the piston and connecting said two chambers, a passage connecting the chamber at one side of said piston to the brake pipe chamber, a tank connected to the chamber on the other side of said piston, an exhaust valve adapted to be moved by said piston, whereby upon slow reductions of the pressure in the brake pipe chamber the piston will remain inactive and the exhaust valve closed, the piston being moved by the trapped pressure when the reduction of pressure in the brake pipe chamber is sudden.

In testimony whereof I hereunto affix my signature.

SPENCER G. NEAL.